B. GRONKE.
CORN PICKER.
APPLICATION FILED FEB. 21, 1913.
1,145,890.
Patented July 13, 1915.
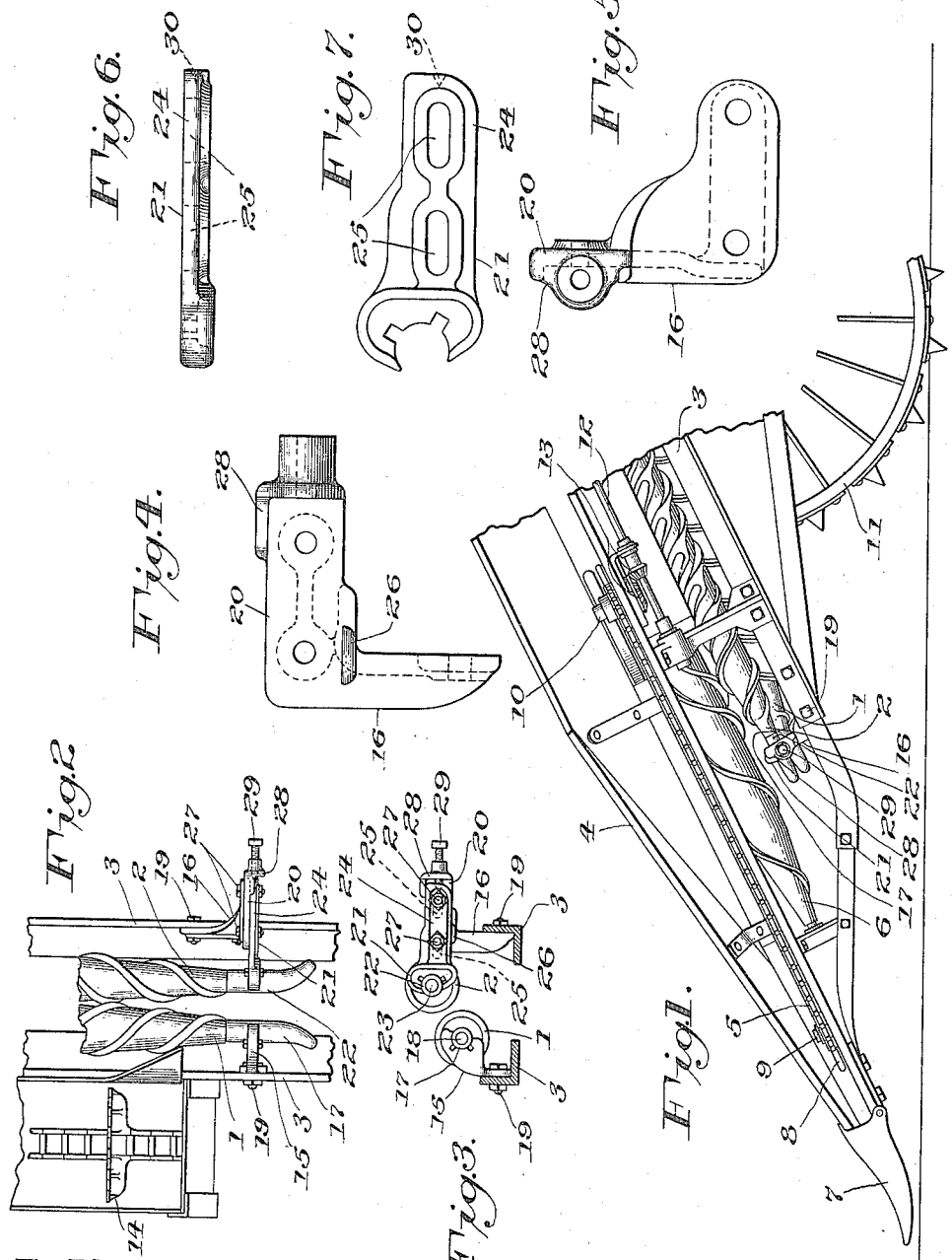
Inventor:
Barney Gronke,

UNITED STATES PATENT OFFICE.

BARNEY GRONKE, OF CHICAGO, ILLINOIS, ASSIGNOR TO INTERNATIONAL HARVESTER COMPANY OF NEW JERSEY, A CORPORATION OF NEW JERSEY.

CORN-PICKER.

1,145,890.

Specification of Letters Patent. Patented July 13, 1915.

Application filed February 21, 1913. Serial No. 749,903.

*To all whom it may concern:*

Be it known that I, BARNEY GRONKE, a citizen of the United States, residing at Chicago, in the county of Cook and State of Illinois, have invented certain new and useful Improvements in Corn-Pickers, of which the following is a full, clear, and exact specification.

My invention relates to corn pickers.

It has for its object to adjust the snapping rolls of a corn picker in an improved manner.

A further object of my invention is to adjust these snapping rolls with greater facility and independently of the guide boards.

I attain these objects by providing improved roll supporting means carried by the frame, one of the same being adjustable independently of the guide boards to change the relative positions of the rolls as desired.

In order that my invention may be clearly and fully disclosed, I have illustrated one embodiment of the same in the accompanying drawings, wherein it is shown applied to a corn picker of the type described and claimed in the patent to John A. Stone, No. 786,239, patented March 28, 1905. It is to be understood, however, that the embodiment of my invention shown herein is susceptible of modification.

Figure 1 is a side elevation of the picker, parts of the same being broken away; Fig. 2 is a top plan view of the snapping rolls, the guide boards being removed; Fig. 3 is an end elevation of the adjusting means for the snapping rolls; Fig. 4 is a side elevation of one of the bracket members; Fig. 5 is an end elevation of the same; Fig. 6 is a top plan view of a coöperating bracket member; Fig. 7 is a side elevation of the same.

The construction shown herein, when broadly considered, comprises a plurality of oppositely rotating snapping rolls, 1 and 2, carried upon a suitable picker frame 3 beneath spaced guide boards 4, and coöperating therewith and with a gathering chain 5 and guiding or feeding rolls 6 in substantially the same manner as described in the above mentioned patent; the snapping rolls 1 and 2 being relatively adjustable with respect to each other through improved means hereinafter described.

Inasmuch as the picker shown is of the same construction as that described and claimed in the above mentioned patent, a specific description and illustration of all of the operating mechanism thereof has been omitted herein. It is to be understood, however, that the guide boards 4 are disposed downwardly at an angle to the ground in the usual manner and carried upon the frame 3, being each provided with a shoe 7 which runs along the ground on the opposite sides of the row. The gathering chain 5 is, as in that construction, provided with a plurality of fingers 8 adapted to grasp the stalks as the picker is moved along the row and feed the same between the guide boards and to the snapping rolls. As shown herein, this gathering chain is rotatably mounted on sprockets 9 and 10 carried by the frame and adapted to be operatively connected to the main wheel 11 of the machine through shaft and gearing connections 12 and 13 in the usual manner. The guiding or forwarding roll 6 is rotatably mounted upon the frame 3 at a point beneath one of the guide boards 4 and substantially parallel to the chain 5, so that it coöperates therewith to feed the stalks to the snapping rolls, being rotated in such a direction that the worm thereon acts on the stalks and feeds it in the proper direction. As in the usual construction, this roll is operatively connected to the main wheel 11.

The snapping rolls 1 and 2 are journaled in the frame 3 in substantially parallel relation to the guiding or forwarding roll 6, and in a plane beneath the same, preferably in such a manner that the snapping roll 2 is substantially vertically beneath the guiding roll 6. As in the usual construction, these snapping rolls are journaled at their upper ends in the frame 3 in a suitable manner and are operatively connected to the main wheel 11 in such a manner as to rotate in opposite directions and feed the ears to a traveling apron 14 which is also driven from the main wheel. In my improvement I provide improved means for adjusting these snapping rolls relatively to each other, as well as improved supports for the lower ends of the same. These means are shown in the form of a plurality of brackets 15 and 16. The bracket 15 is provided with a bearing surface 17 adapted to receive the reduced end 18 of the roll 1 and hold the same in fixed relation to one of the frame members 3, the bracket being fixed to said frame member by a suitable bolt or other means 19, and provided with an inwardly extending end disposed substantially at right angles to the axis of the roll. The bracket 16 on the other hand, while fixed to the frame member 3 by a similar bolt 19 and having its body portion disposed in a plane parallel to the bracket 15 is provided with a portion 20 extending at right angles thereto and away from the roll, which is adapted to be attached to an adjustable coöperating bracket member 21. This bracket member 21 is provided with a suitable bearing surface 22 adapted to receive the reduced end 23 of the roll 2 in substantially the same manner as the bracket 15, and is provided with an elongated laterally extending shank 24 having a pair of longitudinally extending slots 25 formed therein and spaced apart from each other. As shown in Fig. 3, the bracket member 21 is supported upon a horizontally disposed lug 26 formed upon the bracket member 16 and is fixed to the angularly disposed portion of the latter bracket by means of suitable bolts 27, which are adjustable in the slots 25 therein. In order to further position the bracket member 21 with respect to the bracket 15, the rear end of the lateral extension on the latter is provided with a raised or shouldered portion 28 extending across the end of the same and partially along one side of the same, and in order to adjust the bracket member 21 with respect to the bracket member 16, an adjusting bolt 29 is threaded through a suitable opening in the end of the raised portion on the latter and protruded inward so that its end engages in a correspondingly shaped recess 30 in the end of the bracket member 21.

When it is desired to adjust the snapping rolls, as, for instance, when working in wet or dry corn, it is only necessary for the operator to loosen the nuts upon the ends of the bolts 27 and adjust the bolt 29 to change the relative positions of the parts to each other as desired. It is here to be noted that in my improved construction it is unnecessary to adjust the guide boards at the same time the snapping rolls are adjusted, so that not only are the wearing qualities of the boards increased, but the latter are always held in the desired fixed relation to the rest of the machine and the row. It is further to be noted that, due to the improved construction and convenient location of the supporting brackets, the operator is enabled to obtain ready access to the same in order to make the necessary adjustments. Attention is further directed to the fact that the snapping rolls are maintained in the same transverse planes, and that the adjustment obtainable may be refined to the desired limits in order to give the proper action of the rolls upon the ears.

While I have described one embodiment of my invention in this application, it is to be understood that the form shown herein for purposes of illustration is susceptible of modification without departing from the spirit of my invention.

What I claim as my invention, and desire to secure by Letters Patent is:

1. In a corn picker, a frame, a snapping roll journaled thereon, a bracket carried by said frame, said bracket having an arm with a supporting lug and a shoulder portion, a roll bearing member slidable upon said supporting lug in said bracket, and means passing through said shoulder portion and engaging said roll bearing member for adjusting the latter.

2. In a corn picker, a frame, a snapping roll journaled thereon, a bracket carried by said frame, said bracket having an arm with a supporting portion extending laterally therefrom, a roll bearing member slidable upon said laterally extending supporting portion, and means for adjusting the position of and guiding said roll bearing member on said laterally extending portion in a straight line movement.

Chicago, Ill., Feb. 6, 1913.

In testimony whereof I affix my signature, in the presence of two witnesses.

BARNEY GRONKE.

Witnesses:
F. A. RYTHER,
A. L. JOHNSON.

Copies of this patent may be obtained for five cents each, by addressing the "Commissioner of Patents, Washington, D. C."